(12) United States Patent
Kölbl et al.

(10) Patent No.: US 12,007,016 B2
(45) Date of Patent: Jun. 11, 2024

(54) AXLE DRIVE FOR A MOTOR VEHICLE

(71) Applicant: ZF Friedrichshafen AG, Friedrichshafen (DE)

(72) Inventors: Thomas Kölbl, Ruderting (DE); Stephan Brandl, Salzweg (DE); Heidi Bartlsperger, Hauzenberg (DE); Nils Trümper, Passau (DE); Christina Weber, Hinterschmiding (DE); Sophia Schubert, Passau (DE); Alois Biereder, Tiefenbach (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/331,752

(22) Filed: Jun. 8, 2023

(65) Prior Publication Data

US 2023/0400092 A1 Dec. 14, 2023

(30) Foreign Application Priority Data

Jun. 8, 2022 (DE) .......................... 102022205853.4

(51) Int. Cl.
*H02K 9/19* (2006.01)
*B60K 17/16* (2006.01)
(Continued)

(52) U.S. Cl.
CPC ....... *F16H 57/0476* (2013.01); *B60K 17/165* (2013.01); *F16H 37/0813* (2013.01);
(Continued)

(58) Field of Classification Search
CPC ............ F16H 57/0476; F16H 37/0813; F16H 57/0424; F16H 57/0471; B60K 17/165; H02K 7/083; H02K 7/116; H02K 9/19
(Continued)

(56) References Cited

U.S. PATENT DOCUMENTS 11,754,169 B1* 9/2023 Guarino .............. F16H 57/0457
74/467
2009/0127954 A1 5/2009 Mogi
(Continued)

FOREIGN PATENT DOCUMENTS

DE 10 2017 006 807 A1 1/2018
DE 10 2018 117 703 A1 1/2020
(Continued)

OTHER PUBLICATIONS

English Translation of DE102017066807A1; http://translationportal.epo.org; Oct. 12, 2023 (Year: 2023).*
(Continued)

*Primary Examiner* — Roger L Pang
(74) *Attorney, Agent, or Firm* — Crowell & Moring LLP

(57) ABSTRACT

An axle drive for a motor vehicle, comprising an electric machine coupled by a rotor shaft to a transmission for the axle drive, wherein a torque can be transferred from the electric machine to an intermediate shaft with a first gear stage and from the intermediate shaft to another gear train, in particular a differential, with a second gear stage, wherein the rotor shaft or a shaft segment coupled to the rotor shaft is supported in a bearing element, wherein a fluid supply is designed to convey a liquid, in particular oil, into an intermediate space between the bearing element and a side shaft on the axle drive through a fluid channel, and from the intermediate space into the rotor chamber in the electric machine.

20 Claims, 6 Drawing Sheets

(51) Int. Cl.
*F16H 37/08* (2006.01)
*F16H 57/04* (2010.01)
*H02K 7/08* (2006.01)
*H02K 7/116* (2006.01)

(52) U.S. Cl.
CPC ..... *F16H 57/0424* (2013.01); *F16H 57/0471* (2013.01); *H02K 7/083* (2013.01); *H02K 7/116* (2013.01); *H02K 9/19* (2013.01)

(58) Field of Classification Search
USPC ........................................ 475/150, 159, 160
See application file for complete search history.

(56) References Cited

U.S. PATENT DOCUMENTS

| | | | | |
|---|---|---|---|---|
| 2010/0320849 | A1* | 12/2010 | Wilton | F16H 37/082 74/421 A |
| 2012/0286607 | A1* | 11/2012 | Shimizu | F16H 57/0471 310/90 |
| 2021/0213819 | A1* | 7/2021 | Hibino | F16H 57/0427 |
| 2023/0006507 | A1* | 1/2023 | Nakamura | H02K 5/16 |

FOREIGN PATENT DOCUMENTS

| | | |
|---|---|---|
| EP | 3213392 | 5/2016 |
| WO | WO 2016/066215 | 5/2016 |

OTHER PUBLICATIONS

Office Action issued in corresponding German Patent Application No. DE 10 2022 205 853.4, dated Apr. 11, 2023 (10 pages).

* cited by examiner

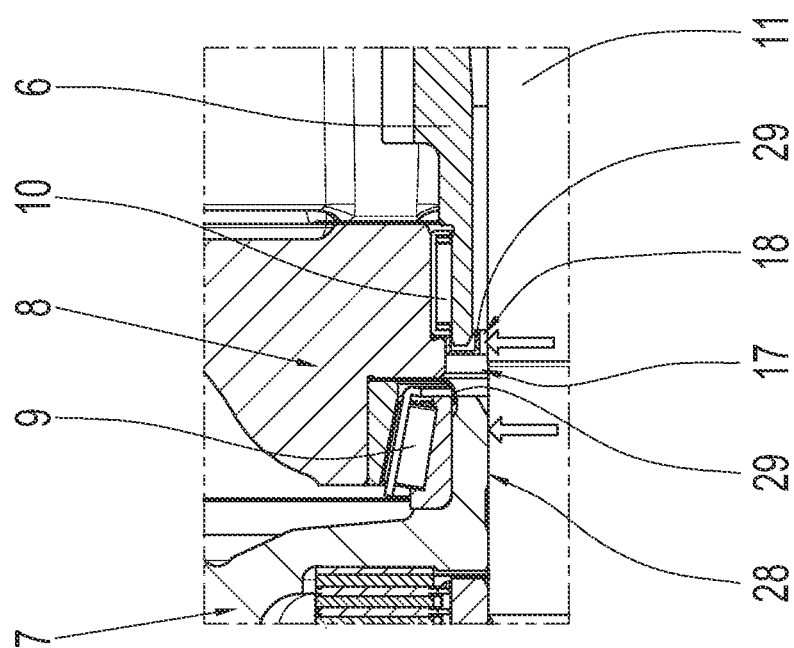

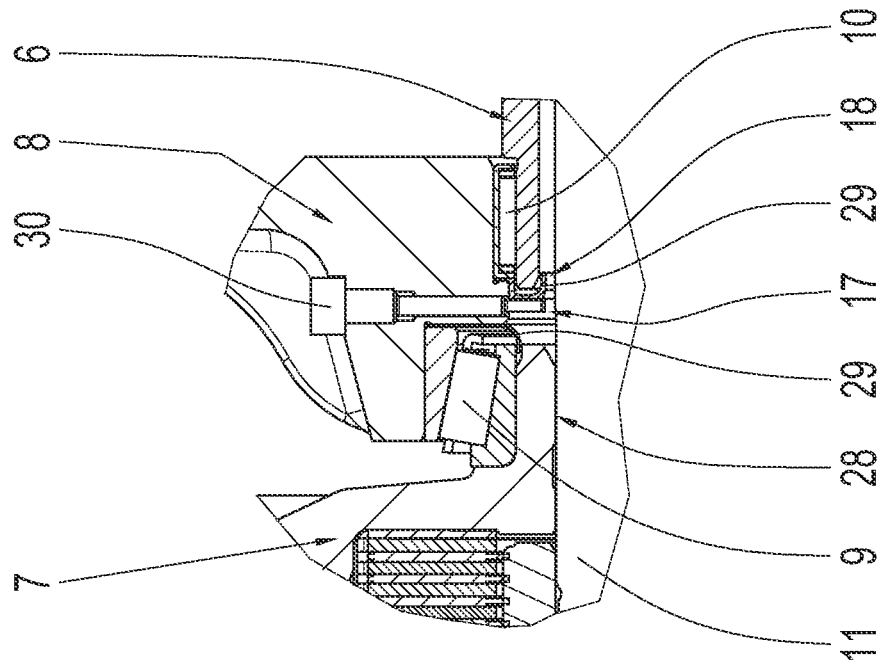

AXLE DRIVE FOR A MOTOR VEHICLE

CROSS-REFERENCE TO RELATED APPLICATION

This application claims priority to German Application No. DE 10 2022 205 853.4, filed on Jun. 8, 2022, the entirety of which is hereby fully incorporated by reference herein.

FIELD

The invention relates to an axle drive for a motor vehicle that comprises an electric machine coupled by a rotor shaft to a transmission for the axle drive, in which a torque from the electric machine can be transferred to an intermediate shaft with a first gear stage, and from the intermediate shaft to a second gear train, in particular a differential, with a second gear stage.

BACKGROUND AND SUMMARY

Axle drives for motor vehicles that comprise an electric machine and two gear stages for transferring the torque generated by the electric machine to an output drive of the axle drive, or the motor vehicle, e.g. using a second gear train, in particular a differential, are fundamentally known from the prior art. Torques can be generated (or received) by the electric machine therewith, and transferred to an intermediate shaft (or received therefrom) with a first gear stage, e.g. comprising a first gearwheel located on the rotor shaft that meshes with a second gearwheel on the intermediate shaft. The intermediate shaft also has a third gearwheel that engages with a fourth gearwheel in the second gear train, e.g. a crown gear for a differential. The rotation generated by the electric machine can be applied to the input of the second gear train by this means. In particular, the rotational rate can be reduced and the torque can be increased.

At least one of the gearwheels in both gear stages rotates through or dips into an oil pan in the course of a "wet lubrication" in the prior art, such that oil becomes distributed throughout the gear train through the rotation of the gearwheel. Oil is sprayed inside the transmission by the rotational movement, resulting in a "splashing" of the oil, such that the gears are lubricated by this "splashed oil."

A second fluid supply is necessary for a cooling circuit for the electric machine, in particular for supplying cooling fluid to the rotor shaft, e.g. into the rotor in the electric machine from a point in the radial interior thereof. With a coaxial axle drive, in particular where the electric machine is coaxial in relation to a side shaft, supplying this fluid is a challenge.

A fundamental object of the present disclosure is to create a better axle drive.

This problem is solved by an axle drive that has the features as disclosed herein. Advantageous designs are also described in the present disclosure.

The present disclosure therefore relates to an axle drive for a motor vehicle that comprises an electric machine coupled to a transmission for the axle drive, which contains a rotor with a rotor shaft. The rotor shaft is coupled to the transmission in order to convert a torque via two gear stages, and conduct it to a differential. The rotor shaft, or a shaft segment coupled to the rotor shaft, is supported on the transmission housing in a bearing element, e.g. a so-called "bearing bracket" or "bearing plate." The disclosure is based on the idea of forming a fluid supply means with which a liquid, in particular oil, is conveyed into an intermediate space between the bearing element and a side shaft of the axle drive through a channel in the bearing element, and from the intermediate space into the rotor chamber in the electric machine.

The fluid supply means conveys the liquid through the fluid channel inside the bearing element, e.g. the "bearing bracket." The bearing element has space for roller bearings, and is connected to a housing for the transmission. The liquid is conveyed from the channel into the intermediate space between the bearing element and the side shaft. The side shaft is one of two side shafts that extend toward the wheels from a differential in the transmission. The transmission has a coaxial design, such that the side shafts, or one of the side shafts and the electric machine, in particular its rotor and rotor shaft, form a coaxial assembly. The term "fluid" used in the framework of this description can be replaced by an appropriate liquid such as "oil," and the names of the devices and elements associated with the "fluid" can also be altered accordingly to obtain "oil channel," "oil supply means," etc.

Basically, the liquid can be supplied arbitrarily to the bearing element, and then conducted there into the fluid channel inside the bearing element. The liquid can then enter the intermediate space from the fluid channel, from where it can be conveyed into the rotor chamber. This liquid can then be conducted axially from the intermediate space into the space between the rotor shaft, or the shaft segment coupled to the rotor shaft, and the side shaft, i.e. parallel to the rotational axis of the side shaft and the rotor shaft, toward the rotor, in order to be conveyed to the cooling circuit inside the electric machine, in particular inside the rotor.

This means that liquid can be advantageously conveyed into the rotor if the electric machine is coaxial thereto inside the transmission. With this proposed supplying of liquid through the bearing element, the bearing element, which can also be referred to as a "bearing plate," or "bearing bracket," can be used as a transfer element to transfer liquid from a fluid circuit into the intermediate space between the rotor shaft, or shaft segment, and the side shafts, or it can contain such a transfer element. The transfer element can form a fitting with which a fluid line is connected to the fluid channel. In this case, the fluid channel extends radially toward the side shaft or the intermediate space from the outside toward the inside. This means that the fluid channel can be slanted at an angle greater or less than 90° to the rotational axis, in particular in the axial direction.

With the proposed conducting of liquid through the bearing element into the intermediate space, there is no need for holes and rotary passages in a central shaft or side shaft, resulting in improvements with regard to strength, drag losses and costs. Furthermore, the liquid can be conducted by a rotational pressure, or a pressure generated through rotation, as a result of it being conveyed into the intermediate space and conducted between the rotor shaft and side shaft, such that there is no need for a separate element for conveying the liquid from the intermediate space into the rotor chamber. The rotor chamber in the framework of this patent application is understood to be the space inside the electric machine in which the rotor is located. The rotor chamber can be delimited by the body of a stator in particular, such that the part of the electric machine located within the inner walls of the body of the stator can be regarded as the rotor chamber.

Both the rotor shaft or a shaft segment coupled to the rotor shaft and a differential cage, in particular an "external" differential cage, can be supported on the bearing element. A sliding fit can be obtained between the differential cage and the side shaft passing though the differential cage. As a result, the outer boundary of the intermediate space in the radial direction is formed by the bearing element, and the inner boundary in the radial direction is formed by the side shaft. The intermediate space is only partially delimited in the axial direction, specifically by the differential and the rotor shaft or the shaft segment. Liquid can pass between the differential and the side shaft and between the rotor shaft or shaft segment and the side shaft, as shall be explained below.

In another design of the axle drive, a fluid conducting element, in particular a nozzle, can be connected to the rotor shaft, with which the liquid is conveyed from the intermediate space into the middle of the rotor chamber. The liquid is then conducted or conveyed from the intermediate space into the rotor chamber such that the liquid is conducted in the axial direction between the side shaft and the rotor shaft, or between the side shaft and a shaft segment connected to the rotor shaft. The fluid conducting element can be coupled directly to the rotor shaft for this, e.g. by press fitting the cylindrical fluid conducting element into or onto a segment of the rotor shaft. The fluid conducting element can also be coupled to the shaft segment such that it is indirectly connected to the rotor shaft.

The fluid conducting element extends axially into the middle of the rotor chamber, such that liquid exiting the fluid conducting element in the axial direction, in particular oil, is sprayed onto the inner surface of the rotor as a result of the rotation thereof. The area in which the liquid is introduced into the rotor chamber depends on the length of the fluid conducting element. The rotational movement causes the liquid to flow along an inner surface of the fluid conducting element such that it is discharged at the end facing away from the intermediate space. Specifically, the fluid conducting element can be placed such that the end thereof is located in the middle, e.g. in the middle third, of the rotor chamber in the axial direction. The fluid conducting element can be balanced.

The liquid is therefore conducted from the intermediate space through the fluid conducting element into the rotor chamber. There is at least one hole in the rotor through which the liquid can pass into the rotor. Specifically, the hole can be formed on or in the inner surface of the rotor, such that the liquid can enter and flow through the rotor, thus cooling it. The rotor can have at least one first hole at a first axial position and at least one second hole at a second axial position, with the two axial positions being at opposite sides of the middle. There can therefore be a first and second hole on the inner surface of the rotor, with the first hole at the first axial position and the second hole at the second axial position. The middle region where the liquid exits the fluid conducting element onto the inner surface of the rotor can be located between the first axial position and second axial position. The selection of the positions of the holes and the end of the fluid conducting element can be arbitrary, depending on how the liquid is to be distributed in the rotor. Specifically, the end of the fluid conducting element can be located between the two holes, e.g. at a third axial position, which is halfway between the first axial position and the second axial position.

There can also be numerous first and second holes, which are then distributed about the circumference of the rotor. By way of example, the first holes can be placed at 90° to one another about the circumference, such that there are four holes. The second holes can also be placed at 90° to one another about the circumference, such that there are also four second holes on the inner surface of the rotor. The number and placement or distribution of the individual holes can be arbitrary. The liquid, e.g. oil, can pass through the holes into the rotor. The liquid can enter the laminations through the inner wall of the rotor and flow between the laminations, thus absorbing and conducting heat into the fluid circuit.

The axle drive can have at least one fluid guidance element, in particular a fluid deflection plate with which liquid flowing into at least one hole in the rotor is conveyed onto at least winding head in the electric machine. The oil conducted radially outward through the holes and into the rotor is moved by centrifugal force against at least one fluid guidance element. The fluid guidance element is aligned or positioned such that the liquid flows toward the at least one winding head in the electric machine. The liquid, e.g. oil, can therefore also remove heat from the winding head. After passing over the winding head, the liquid can return to the oil pan where a heat exchange takes place such that the liquid can be returned to the fluid circuit.

According to another design of the axle drive, the inner surface of the rotor shaft and/or shaft segment can be conical, opening toward the rotor chamber. As explained above, the liquid should be conveyed in particular by the rotation taking place inside the transmission, or inside the axle drive. The liquid can also be forced into the bearing element, and the axial conveyance should at least be facilitated by the rotation of the side shaft and/or the rotor shaft or shaft segment. The axial conveyance is also improved by the conical design of the rotor shaft and/or the shaft segment. This means that the inner diameter of the hollow rotor shaft or shaft segment does not remain constant, and instead at least one of the elements has a conical inner diameter, expanding toward the rotor chamber. Because the inner surface expands conically in the axial direction, the liquid displays a tendency to flow in one direction, specifically toward the rotor chamber from the intermediate space. In particular, the diameter of the hole in the rotor shaft and/or the hole in the shaft segment increases from the intermediate space toward the rotor chamber with a conical inner surface.

According to another design of the axle drive, a first axial hole in the intermediate space bordered by the rotor shaft or shaft segment can be larger than the second axial hole, lying opposite it in the axial direction, in the intermediate space bordered by a second gear train, in particular a differential. The intermediate space can be delimited radially by the bearing element and the side shaft, as explained above. The intermediate space is delimited axially by the second gear train, in particular a section of the differential cage, in one direction, and by the rotor shaft or a shaft segment coupled to the rotor shaft in the other direction.

There is still a first axial hole between the rotor shaft or the shaft segment and the side shaft, and a second axial hole between the gear train and the side shaft, in the radial direction. The diameter of the first axial hole should be greater than that of the second axial hole, such that the amount of liquid conveyed from the intermediate space in the first axial direction, i.e. from the intermediate space toward the rotor chamber, is significantly greater than the amount of liquid conveyed from the intermediate space through the second axial hole into the second gear train, in particular the differential. A liquid reservoir is therefore formed in the intermediate space, i.e. the intermediate space functions as a collecting chamber or reservoir for the liquid.

The distribution of the liquid from the intermediate space in the individual directions can be determined by the sizes of the first axial hole and second axial hole. The axial holes ultimately define the gap sizes or apertures between the side shaft and the gear train, and between the side shaft and the rotor shaft or shaft segment. Because the portion of the liquid conducted toward the rotor chamber is used in particular for cooling the rotor, the volumetric flow toward the rotor chamber is significantly greater than that the portion of the liquid conducted from the intermediate space into the gear train, e.g. the differential. The liquid flowing through the second axial hole is only used to lubricate the gear train, e.g. the differential.

As explained above, the bearing element can be designed to support at least the rotor shaft, or the shaft segment coupled to the rotor shaft, and the gear train, e.g. a differential cage. This bearing element can contain roller bearings for this, e.g. ball bearings, needle bearings, or some other type of roller bearings. At least one retention element can be formed in this design, which retains the liquid in the intermediate space upstream of the roller bearings. The intermediate space functions as a reservoir, from which the liquid is distributed to the first axial hole and second axial hole. The retention element can also be designed to limit the amount of liquid applied to the roller bearings from the intermediate space. In particular, a first roller bearing can have a dedicated first retention element, and a second roller bearing can have a dedicated second retention element, each of which limits the amount of liquid flowing through the roller bearings from the intermediate space.

The retention elements can form a labyrinth for this, such that the roller bearings are sealed, without coming in contact therewith. Specifically, liquid can flow from the intermediate space to the roller bearings at a defined rate, in order to ensure that the roller bearings are lubricated to a specific extent. With the second axial hole, the differential can be supported on the side shaft with a journal bearing, such that liquid from the intermediate space can also be used here to lubricate the differential.

The axle drive can also be designed such that the intermediate space forms an annular chamber. This annular chamber can be delimited radially on the outside by an inner surface of the bearing element, and on the inside by an outer surface of the side shaft. In the axial direction, the annular chamber is delimited on one side by the second gear train, e.g. the differential, and the roller bearing between the differential cage and the bearing element. In the other axial direction, the annular chamber is delimited by the rotor shaft or the shaft segment, and the roller bearing between the rotor shaft or shaft segment and the bearing element.

These boundaries do not form an impenetrable seal, but instead form a spatial delimitation. Consequently, liquid can exit the intermediate space, e.g. through the first axial hole toward the rotor chamber, and/or through the second axial hole into the gear train and/or through the retention element upstream of the roller bearings. The liquid, e.g. oil, can be retained evenly about the circumference in the annular chamber, such that the liquid can be distributed evenly over the circumference of the transmission. Furthermore, the liquid can be distributed in a targeted manner in the axial direction, or onto the individual components of the transmission, as a result of the retention.

A blocking element can be placed in the annular chamber, i.e. the intermediate space in the form of an annular chamber, in particular an intervening element extending radially, at least, in part into the annular chamber. The blocking element reduces the diameter of the intermediate space, thus restricting the movement of the liquid in the intermediate space caused by the rotation of the side shaft, and/or rotor shaft, and/or shaft segment, and/or gear train. In particular, the blocking element can extend over the entire radial extension of the intermediate space, such that the liquid is entirely prevented from flowing circumferentially through the intermediate space.

A fluid column forming in the intermediate space is thus unable to rotate with the other components in the transmission, such that the fluid column remains stationary in relation to the side shaft and/or rotor shaft. The blocking element therefore forms a rotational brake for the liquid retained in the intermediate space or annular chamber. Specifically, the liquid does not rotate therewith. By way of example, a screw screwed into the bearing element in the radial direction can function as the blocking element. The blocking element can also be formed or incorporated therein without cutting, e.g. as an integral component of the bearing element.

In addition to the axle drive, the present disclosure also relates to a motor vehicle that contains such an axle drive. All of the advantages, details and features that have been described in reference to the axle drive can be applied to the motor vehicle.

The present disclosure shall be explained below in reference to the drawings based on an exemplary embodiment. The drawings are schematic illustrations.

BRIEF DESCRIPTION OF THE DRAWINGS

FIG. 5 shows a detail of FIG. 4 containing an intermediate space according to a first exemplary embodiment;
and
FIG. 6 shows a detail of FIG. 4 containing an intermediate space according to a second exemplary embodiment.

DETAILED DESCRIPTION

Figure 1:
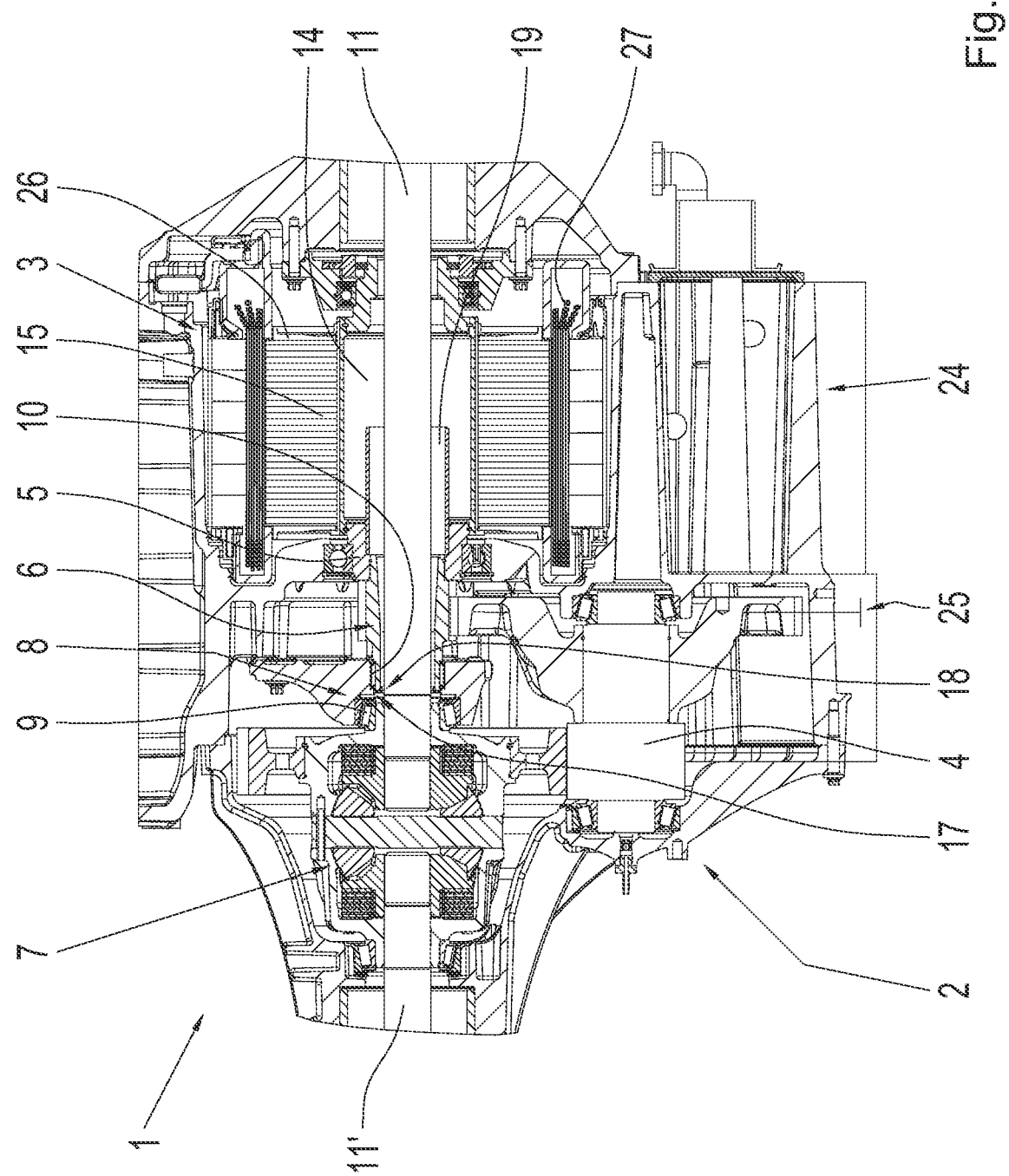
FIG. 1 shows a detailed illustration of an axle drive in a motor vehicle.

FIG. 1 shows a detail of a motor vehicle, in particular an axle drive 1 for a motor vehicle, which has a transmission 2 that is coupled to an electric machine 3. This transmission 2 has an intermediate shaft 4 coupled to a rotor shaft 5. In this exemplary embodiment, a shaft segment 6 is connected to the rotor shaft 5, although the rotor shaft 5 can also be continuous, with the shaft segment 6 forming an integral part thereof. The description can be applied accordingly.

The intermediate shaft 4 has two gear stages, the first of which couples the shaft segment 6 to the intermediate shaft 4, and the second of which couples the intermediate shaft 4 to a differential 7. The transmission 2 also has a bearing element 8, which can also be referred to as a "bearing plate," or "bearing bracket." The bearing element 8 is permanently connected to a housing for the transmission 2. The shaft segment 6 is supported on the bearing element 8 with a first roller bearing 9, and on the differential 8, in particular on an external differential cage, with a second roller bearing 10.

Figure 2:
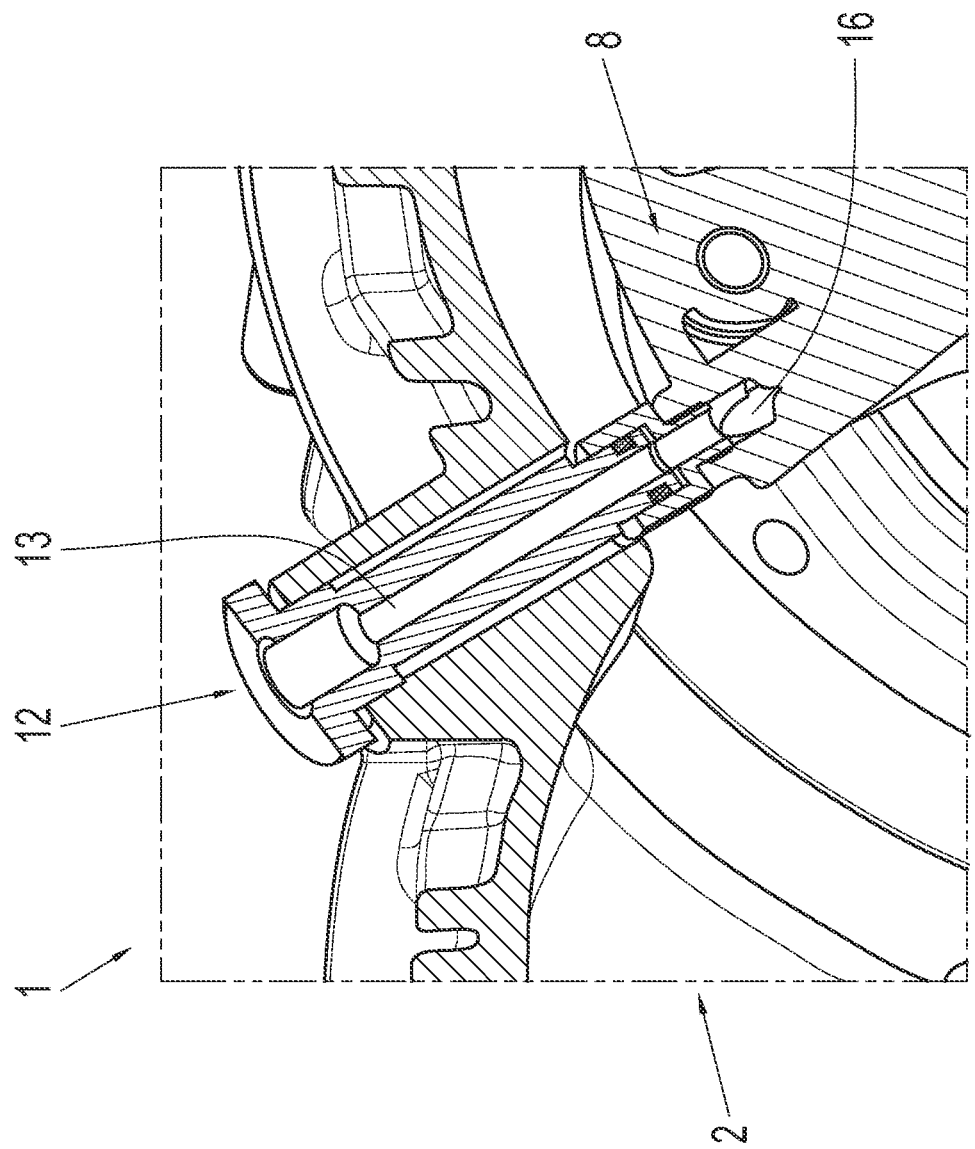
FIG. 2 shows a detail of FIG. 1, containing a bearing element.

The differential 7 has two side shafts 11, 11'. The electric machine 3, and thus the rotor shaft 5 and shaft segment 6, are coaxial to the side shaft 11. The axle drive 1 has a fluid supply means 12, the fluid supply element 13 of which is shown in FIG. 2. A liquid such as oil can be introduced by the fluid supply means 12 into a rotor chamber 14 inside the rotor 15 in the electric machine 3, as shall be explained below. The fluid supply element 13 is connected to a fluid channel 16 (see FIGS. 2, 3) for this, which extends radially through the bearing element 8 and opens into an intermediate space 17 between the bearing element 8 and the side shaft 11.

Starting from the intermediate space 17 (see FIG. 4), the liquid can be conducted axially toward the rotor chamber 14 through a first axial hole 18, which is formed between the shaft segment 6 and the side shaft 11 in the radial direction. A fluid conducting element 19 is placed on the rotor shaft 5 in this exemplary embodiment, with which conveyance of the liquid into the rotor 15 is facilitated. The fluid conducting element 19 is placed in this exemplary embodiment such that the liquid exiting it is conveyed to the middle of the rotor 15. The liquid can then flow in both axial directions, and thus flow through a first hole 20 and/or a second hole 21, located in a first axial position 22 and second axial position, respectively, into the rotor 15, in particular into the laminations in the rotor 15.

In other words, the liquid is conveyed out of the intermediate space 17 through a gap between the shaft segment 6 and the side shaft 11 into the fluid conducting element 19. The liquid is conveyed onto the inner surface of the fluid conducting element 19 in the rotor chamber 14, e.g. in the middle of the rotor chamber 14, by the rotation of the fluid conducting element 19, which is coupled to the rotor shaft and can then flow radially outward at the end of the fluid conducting element 19 onto the inner surface of the rotor 15. The liquid is subsequently conducted through the holes 20, 21 into the laminations in the rotor 15 by the centrifugal force, in order to absorb and discharge heat.

The inner surface of the shaft segment 6 has a conical design opening toward the rotor chamber 14, i.e. the inner surface of the shaft segment 6 has an aperture angle toward the rotor chamber 14, that facilitates the movement of the liquid.

Figure 3:
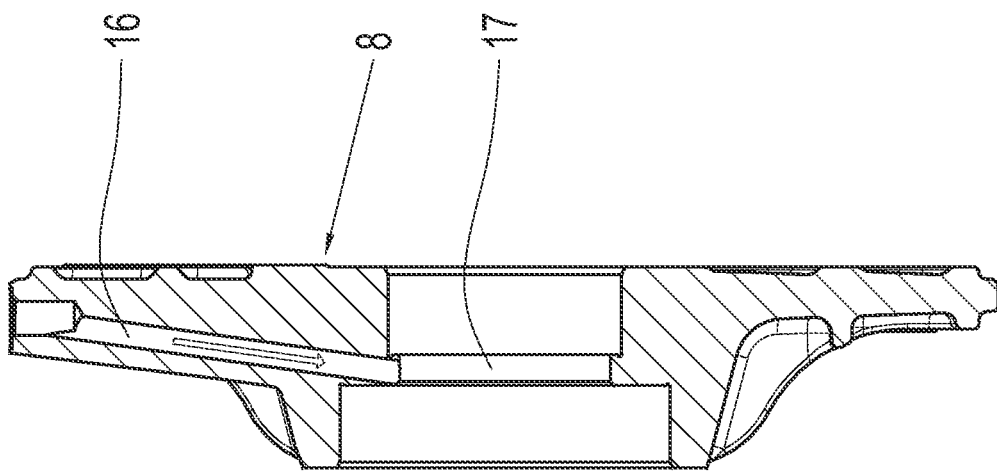
FIG. 3 shows an isolated illustration of a bearing element for the axle drive shown in FIGS. 1 and 2.

FIG. 2 shows a fluid supply element 13, which has a fitting, by way of example, that can be connected to a fluid supply line. Liquid can be forced by the fluid supply element 13 through the fluid supply line, e.g. from a reservoir 24 (see FIG. 1), which is upstream of a dry sump 25, or transmission chamber in the transmission 2. The liquid can then be conveyed from the fluid supply element 13 into the channel 16 (see FIGS. 2, 3), and from there into the intermediate space 17. FIG. 3 shows a detailed illustration of the bearing element 8 separately, in which the channel 16 runs in the radial direction, thus connecting the fluid supply element 13 to the intermediate space 17.

A fluid guidance element 26 is also shown in FIG. 1, in particular a deflector plate, which is designed to deflect liquid flowing through the holes 20, 21 into the rotor 15, and which has flown through the laminations in the rotor 15, onto winding heads 27. The liquid can subsequently be conveyed into the aforementioned dry sump 25, from where it can be conveyed to the reservoir 24 and then supplied to the fluid line by a conveyance mechanism, e.g. a pump, and thus into the fluid supply element 13. This results in a fluid circuit. The fluid circuit can supply other areas with the liquid, such that other cooling or lubrication needs can also be fulfilled.

Figure 4:
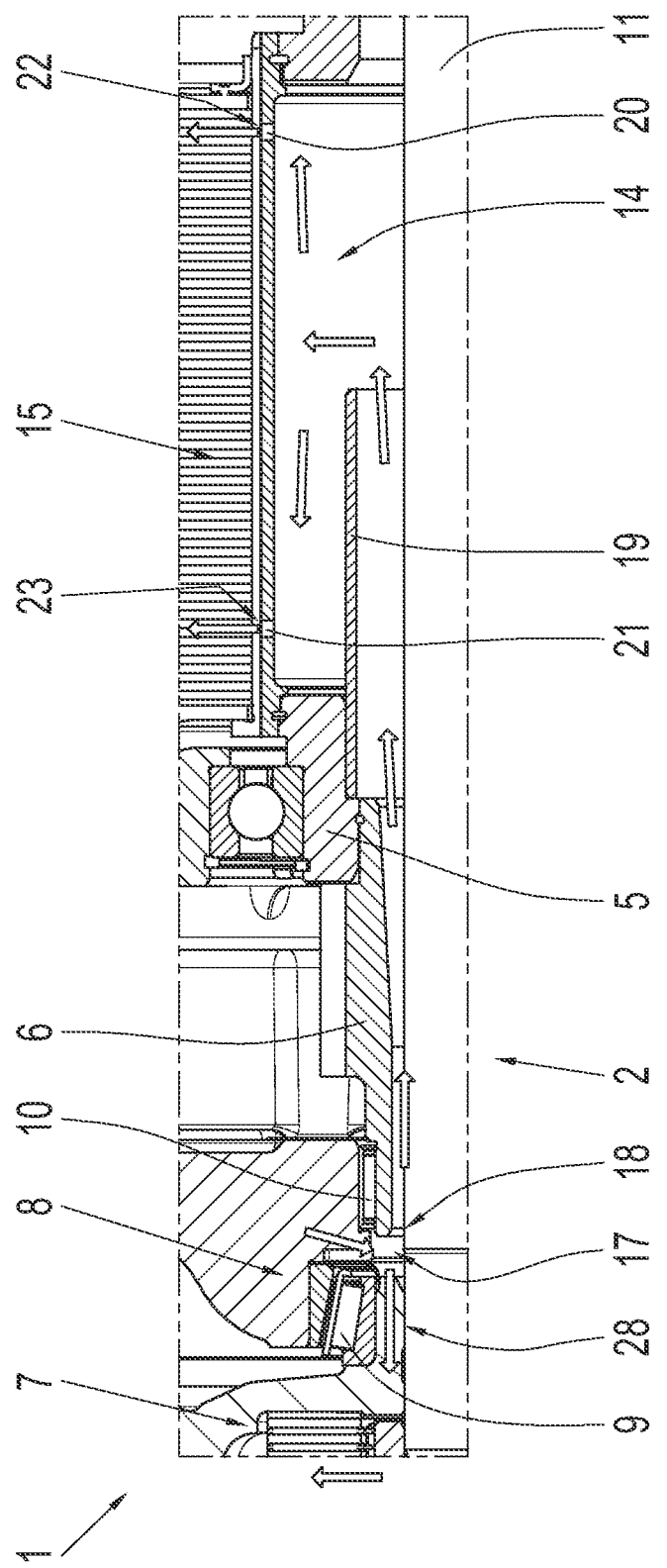
FIG. 4 shows a detail of the axle drive shown in FIG. 1.

Arrows in FIG. 4 schematically indicate the flow of liquid from the intermediate space 17 through the first axial hole 18 and second axial hole 28. Liquid is primarily conveyed in the axial direction through the first axial hole 18, and therefore through the annular gap between the shaft segment 6 and the side shaft 11, toward the rotor chamber 14, and then into the rotor 15 through the holes 20, 21. The second axial hole 28 offers an alternative path, through which liquid can flow from the intermediate space 17 into the differential 7. The amount of liquid flowing through the paths can be determined by the sizes of the axial holes 18, 28. In this case, the first axial hole 18 is significantly larger than the second axial hole 28, such that the path through the second axial hole 28 ensures that the differential 7 is sufficiently lubricated, while most of the liquid from the intermediate space 17 flows through the first path through the first axial hole 18 in order to cool the rotor 15.

FIG. 5 shows an enlarged illustration of the intermediate space 17 in the axle drive 1. There is a first roller bearing 9 between the shaft segment 6 and the bearing element 8, and a second roller bearing 10 between the differential 7, in particular the differential cage, and the bearing element 8. The roller bearings 9, 10 have retention elements 29, in particular retention plates, which form a labyrinth structure, thus retaining the liquid in the intermediate space 17. The retention elements 29 also ensure that only a small amount of liquid is applied to the roller bearings 9, 10 in order to lubricate them. This ensures that most of the liquid flows out of the intermediate space 17 through the first axial hole 18, and therefore into the rotor chamber 14.

The intermediate space is basically delimited radially outward by an inner surface of the bearing element 8, and radially inward by an outer surface of the side shaft 11. The intermediate space 17 is also primarily delimited axially by the differential 7, in particular the outer differential cage, at one end, and by the shaft segment 6 at the other axial end. The intermediate space 17 can also be delimited by the retention elements 29. This results in an intermediate space surrounding the side shaft 11, which thus forms an annular chamber.

As shown in FIG. 6, there can be at least one blocking element 30 along the circumference, which extends at least in part into the intermediate space 17. There can also be numerous blocking elements 30 distributed over the circumference, e.g. at 90° to one another. The blocking element 30 causes the formation of a fluid column, which cannot rotate with the side shaft 11 or the shaft segment 6, but instead remains stationary along the circumference.

This prevents liquid or oil from moving in the intermediate space 17 along with the rotating shafts, i.e. the side shaft 11 and shaft segment 6. The rotation of the shafts generates a rotational pressure, such that the liquid has a tendency to flow outward. The blocking element 30 prevents this tendency and this rotation. This facilitates the movement of the liquid in the axial direction, in particular toward the rotor chamber 14, because the blocking element 30 ultimately acts as a "liquid brake," or "oil brake" in the intermediate space 17 forming an annular chamber. The blocking element 30 can be in the form of a screw, for example, that is then screwed into a corresponding hole in the bearing element 8. The blocking element 8 can also be formed on the bearing element 8 without cutting.

The advantages, details, and features shown in the individual drawings can be arbitrarily combined with one another, exchanged among one another, and applied to one another.

REFERENCE SYMBOLS 1 axle drive
2 transmission
3 electric machine
4 intermediate shaft
5 rotor shaft
6 shaft segment
7 differential 8 bearing element
9, 10 roller bearing
11, 11' side shaft
12 fluid supply means
13 fluid supply element
14 rotor chamber
15 rotor
16 fluid channel
17 intermediate space
18 first axial hole
19 fluid conducting element
20, 21 hole
22, 23 axial position
24 reservoir
25 dry sump
26 fluid guidance element
27 winding head
28 second axial hole
29 retention element
30 blocking element

The invention claimed is:

1. An axle drive for a motor vehicle, comprising:
an electric machine coupled by a rotor shaft to a transmission for the axle drive,
wherein a torque can be transferred from the electric machine to an intermediate shaft with a first gear stage, and from the intermediate shaft to a second gear train with a second gear stage, and
wherein the rotor shaft or a shaft segment coupled to the rotor shaft is supported in a bearing element; and
a fluid supply configured to convey oil into an intermediate space between the bearing element and a side shaft on the axle drive through a fluid channel, and from the intermediate space into a rotor chamber in the electric machine, wherein the rotor shaft and/or the shaft segment has a conical inner surface opening toward the rotor chamber.

2. The axle drive according to claim 1, wherein the second gear train comprises a differential.

3. The axle drive according to claim 1, comprising:
a fluid conducting element coupled to the rotor shaft configured to convey a liquid from the intermediate space into a middle of the rotor chamber.

4. The axle drive according to claim 3, wherein the fluid conducting element is a nozzle.

5. The axle drive according to claim 3, wherein the rotor chamber has at least one first hole at a first axial position, and at least one second hole at a second axial position, and wherein the first axial position and the second axial position are on opposite sides of the middle of the rotor chamber.

6. The axle drive according to claim 5, comprising:
at least one fluid guidance element configured to guide fluid flowing from at least one hole of the first hole or the second hold into the rotor onto at least one winding head in the electric machine.

7. The axle drive according to claim 6, wherein the at least one fluid guidance element is a fluid deflection plate.

8. The axle drive according to claim 1, wherein a hole in the intermediate space bordered by the rotor shaft or the shaft segment is larger than an axially opposing hole in the intermediate space bordered by the second gear train.

9. The axle drive according to claim 1, wherein the second gear train and the rotor shaft or the shaft segment are supported on the bearing element by roller bearings, and
wherein at least one retention element is configured to retain a liquid in the intermediate space upstream of the roller bearings.

10. The axle drive according to claim 1, wherein the intermediate space forms an annular chamber.

11. The axle drive according to claim 10, wherein a blocking element exists in the annular chamber and comprises an intervening element extending, at least in part, radially into the annular chamber.

12. A motor vehicle, comprising the axle drive according to claim 1.

13. An axle drive for a motor vehicle, comprising:
an electric machine coupled by a rotor shaft to a transmission for the axle drive,
wherein a torque can be transferred from the electric machine to an intermediate shaft with a first gear stage, and from the intermediate shaft to a second gear train with a second gear stage, and
wherein the rotor shaft or a shaft segment coupled to the rotor shaft is supported in a bearing element; and
a fluid supply configured to convey oil into an intermediate space between the bearing element and a side shaft on the axle drive through a fluid channel, and from the intermediate space into a rotor chamber in the electric machine,
wherein the second gear train and the rotor shaft or the shaft segment are supported on the bearing element by roller bearings, and
wherein at least one retention element is configured to retain a liquid in the intermediate space upstream of the roller bearings.

14. The axle drive according to claim 13, further comprising: a fluid conducting element coupled to the rotor shaft configured to convey a liquid from the intermediate space into a middle of the rotor chamber.

15. The axle drive according to claim 13, wherein the rotor chamber has at least one first hole at a first axial position, and at least one second hole at a second axial position, and wherein the first axial position and the second axial position are on opposite sides of a middle of the rotor chamber.

16. The axle drive according to claim 13, wherein a hole in the intermediate space bordered by the rotor shaft or the shaft segment is larger than an axially opposing hole in the intermediate space bordered by the second gear train.

17. An axle drive for a motor vehicle, comprising:
an electric machine coupled by a rotor shaft to a transmission for the axle drive,
wherein a torque can be transferred from the electric machine to an intermediate shaft with a first gear stage, and from the intermediate shaft to a second gear train with a second gear stage, and
wherein the rotor shaft or a shaft segment coupled to the rotor shaft is supported in a bearing element; and
a fluid supply configured to convey oil into an intermediate space between the bearing element and a side shaft on the axle drive through a fluid channel, and from the intermediate space into a rotor chamber in the electric machine,
wherein the intermediate space forms an annular chamber, and wherein a blocking element exists in the annular chamber and comprises an intervening element extending, at least in part, radially into the annular chamber.

18. The axle drive according to claim 17, further comprising: a fluid conducting element coupled to the rotor shaft configured to convey a liquid from the intermediate space into a middle of the rotor chamber.

19. The axle drive according to claim 17, wherein the rotor chamber has at least one first hole at a first axial position, and at least one second hole at a second axial position, and wherein the first axial position and the second axial position are on opposite sides of a middle of the rotor chamber.

20. The axle drive according to claim 17, wherein a hole in the intermediate space bordered by the rotor shaft or the shaft segment is larger than an axially opposing hole in the intermediate space bordered by the second gear train.

* * * * *